Figure 1:
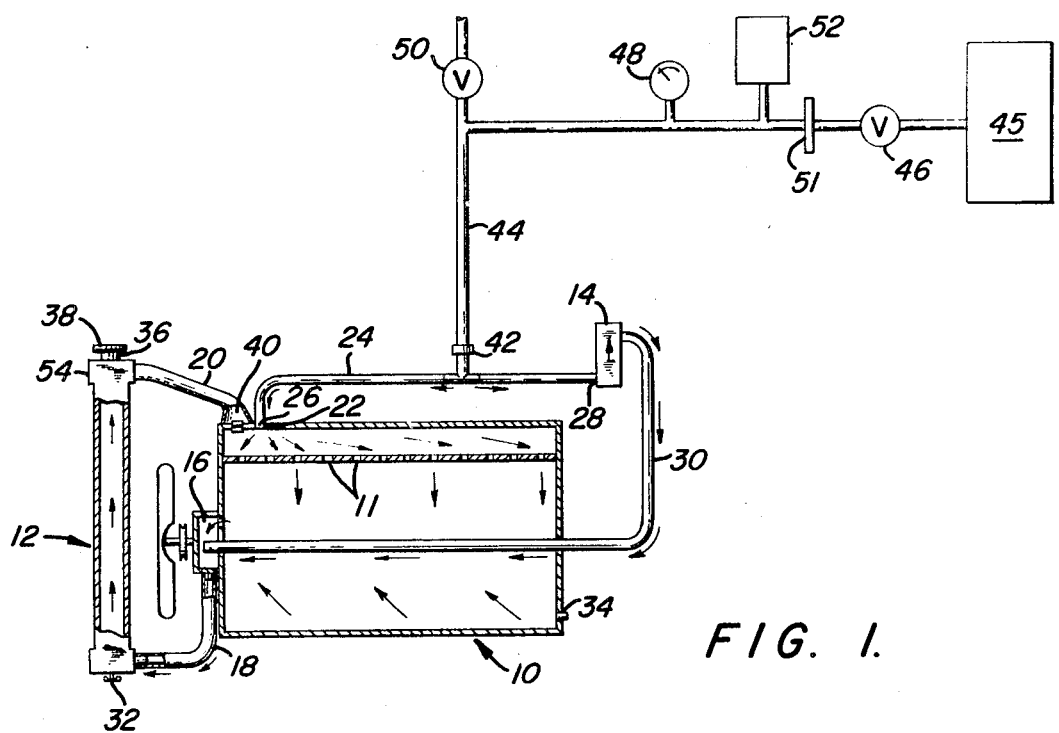

United States Patent

Moyer

[15] 3,650,147

[45] Mar. 21, 1972

[54] COOLING SYSTEM PRESSURE TESTER

[72] Inventor: Robert G. Moyer, Ridgefield, Conn.

[73] Assignee: Union Carbide Corporation, New York, N.Y.

[22] Filed: June 26, 1970

[21] Appl. No.: 50,202

[52] U.S. Cl. ............................................................73/49.7
[51] Int. Cl. .......................................................G01m 3/04
[58] Field of Search..........................73/49.7, 118, 47, 37, 40

[56] References Cited

UNITED STATES PATENTS 2,760,367 8/1956 Stromberg..................................73/40
2,893,238 7/1959 Kayser........................................73/40

Primary Examiner—S. Clement Swisher
Assistant Examiner—William A. Henry, II
Attorney—Paul A. Rose, John F. Hohmann and John R. Doherty

[57] ABSTRACT

A cooling system pressure tester for automotive engine cooling systems and a method for pressure testing such systems. The pressure tester comprises a fitting having outlets connected in line with the heater system conduit, a conduit connected between a source of pressurized water and the inlet of the fitting, and means for controlling and means for measuring the pressure in the system. The entire automotive engine cooling system may be pressure tested at one time.

11 Claims, 2 Drawing Figures

3,650,147

INVENTOR
ROBERT G. MOYER
BY
ATTORNEY

COOLING SYSTEM PRESSURE TESTER

This invention relates to a pressure tester for automotive engine cooling systems and a method for pressure testing such systems.

The cooling system of conventional automobiles comprises a radiator, an engine block having flow paths therein and a water pump which are all connected by conduits for circulating coolant. The water pump is usually attached to the lower front of the engine and communicates with the flow paths therein. In general, a lower radiator conduit connects the water pump and the bottom of the radiator, and an upper radiator conduit connects the upper end of the engine flow paths and the top of the radiator, thereby effecting a complete flow circuit through the engine and the radiator. A thermostat is usually placed in the cooling system at the top of the engine near the upper radiator conduit to block water circulation when the engine is operating below desired temperatures.

A heater is also included in the cooling system of most automobiles, and is generally located near or in the interior of the automobile. The heater is usually connected to the other parts of the cooling system by a heater-supply conduit slipped tightly over a nipple fitted in a heater supply aperture on the top of the engine and over a nipple on the heater, and by a heater-return conduit connected to the heater and emptying into the water pump.

It is well known that automotive cooling systems should be pressure tested periodically in order to detect leaks in the system. As the engine temperature rises during operating the temperature of the coolant in the system will also rise. Since the cooling system is completely enclosed, the pressure within the system will rise in relation to the temperature rise of the coolant. Minor leaks present in the system may result in excessive loss of coolant as the pressure rises in the system. The more coolant that is lost, the less capability the cooling system has for keeping the engine temperature from rising above a normal operating level. This could result in engine overheating and damage to the engine parts.

The common method of pressure testing an automotive cooling system utilizes a hand operated air pump which is attached to the radiator filler neck after the radiator cap has been removed. Air is pumped into the cooling system until the desired pressure level is attained. The pressure level is usually indicated by a gauge attached to the air pump. The cooling system is checked for leakage by observing the gauge indicator. If the indicator holds steady at the test pressure level, normally the usual operating pressure of the system, this would indicate that the system will hold pressure and therefore there are no leaks. If the gauge indicator drops from the test pressure level, this would indicate a loss in pressure and therefore a leak. If a leak is indicated an inspection of the cooling system is made for escaping liquid.

The radiator cap "opening pressure" is tested separately by attaching the cap onto a special adapter for pressurizing with the same hand pump. The pressure is increased until the pump pressure gauge indicates the cap opening pressure by a sudden drop in the pressure. The actual pressure at which the cap will release is then compared to the cap set pressure, i.e., the pressure at which the cap is supposed to open, to determine if the pressure cap is functioning properly.

It will be seen that in utilizing the above method for pressure testing an automotive engine cooling system the radiator cap must be pressure tested independently of the rest of the engine cooling system. As a consequence, this method has proved to be very time consuming. It is also not totally accurate in giving a true picture of the pressure reliability of an engine cooling system under normal operating conditions, since the test procedure does not indicate whether the radiator cap is seated properly on the radiator filler neck. Unless the radiator cap is seated properly on the radiator filler neck, leakage will occur under cooling system operating conditions. Therefore, it is essential that the radiator cap be pressure tested while in place on the filler neck seat in order to insure the pressure integrity of the whole engine cooling system.

A radiator overflow tube is normally provided in an automotive engine cooling system. One end of the tube is affixed to the radiator filler neck in such a manner that when the pressure in the system builds up above the cap opening pressure, the main valve in the cap will lift off its seat and allow the pressure to release through an outlet in the filler neck to which is attached the overflow tube. The other end of the tube vents to the atmosphere. It is essential to check the radiator overflow tube for blockage to insure safe operation of the cooling system. In the event that pressure must be released the tube must be clear to prevent serious damage to the cooling system. When using the method described herein above, the pressure release capability of the radiator overflow tube is not tested. The hand operated air pump is attached in such a manner to the radiator filler neck that the outlet to the radiator overflow tube is covered by the pump mechanism during the test.

If a leak is indicated using the hand operated air pump and gauge, it is not always readily ascertainable where the leak is located. The normal engine cooling system is liquid filled except for a small volume of air located at the top of the radiator, the highest point in the system. The air pressure in this portion of the radiator is increased by the hand pump which is connected to the radiator filler neck at the top of the radiator. Therefore, any leak which may occur in the air-filled section of the radiator can only be detected by the presence of escaping air which cannot be observed by a visual inspection.

It is, therefore, an important object of this invention to provide an improved pressure tester for an automotive engine cooling system which is more reliable and easier to use than those presently available.

A more specific object of this invention is to provide an improved pressure tester for an automotive engine cooling system which does not require that the radiator cap be removed and pressure tested separately.

Another object of this invention is to provide an improved pressure tester for an automotive engine cooling system which is capable of testing the pressure release capability of the radiator overflow tube.

Another object of this invention is to provide a pressure tester for an automotive engine cooling system which will hydraulically pressure test the entire cooling system.

A further object of this invention is to provide a convenient and effective method of pressure testing an automotive engine cooling system which is capable of testing the entire cooling system under normal operating conditions.

The foregoing and other objects are achieved by the invention which comprises a pressure tester for an automotive engine cooling system comprising a fitting having outlets connected in line with the heater supply conduit of the cooling system, a conduit connected between a source of pressurized water and the inlet of said fitting, means for controlling the flow of water through said water conduit and means for measuring the pressure measurement connected in line with said water conduit.

Figure 2:
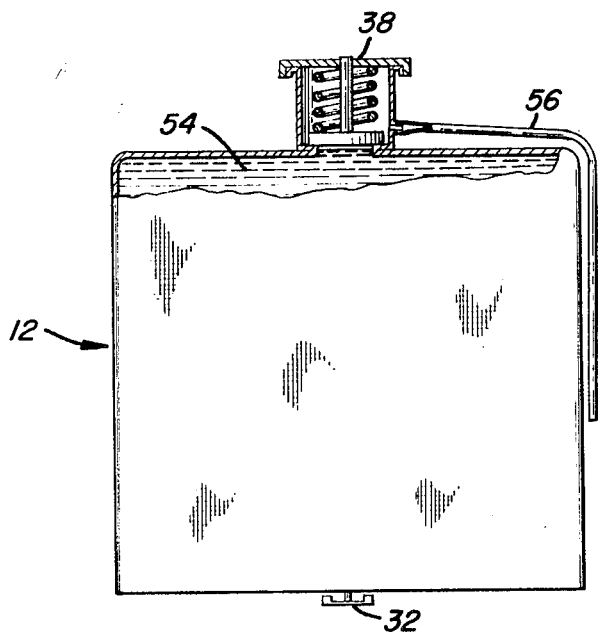

A fuller understanding of this invention will be facilitated by reference to the accompanying drawing, in which:

FIG. 1 is a schematic view of a conventional automotive engine cooling system showing the pressure tester connected thereto; and FIG. 2 is a vertical section through the radiator of the automotive engine cooling system shown in FIG. 1.

In particular, and with reference to FIGS. 1 and 2 of the drawings, there is shown a conventional automotive engine cooling system comprising an engine block 10 having flowpaths 11 therein for coolant, a radiator 12, a heater 14, and a water pump 16 attached to the front of the engine block 10. The radiator 12 is connected to the water pump 16 by a lower radiator conduit 18, and to the engine block 10 by an upper radiator conduit 20. A heater-supply aperture 22 is provided at the top of the engine block 10 and one end of a heater-supply conduit 24 fits over a nipple 26 provided in the aperture 22. The other end of the heater-supply conduit 24 fits over a heater nipple 28 on the heater 14. A heater-return conduit 30 provides a flow connection between the heater 14 and the water pump 16.

A drain cock 32 is provided at the bottom of the radiator 12 and a drain plug 34 is provided in the bottom of the engine block 10 to drain coolant for the engine cooling system. The radiator 12 has a filler neck 36 at the top which is covered by a radiator cap 38. A thermostat 40 fits in the engine block 10 at the point where the upper radiator conduit 20 is attached to the engine block 10. The thermostat 40 regulates coolant circulation between the engine block 10 and the radiator 12.

As shown in FIG. 1, a T-fitting 42 is connected in line with the heater-supply conduit 24 and connected to the T-fitting 42 is a water conduit 44. The water conduit 44 may be connected at any other convenient point in the engine cooling system, such as the drain plug 34 of the engine block 10. The other end of the water conduit 44 is connected to a pressurized water supply 45. A water flow control means, such as a valve 46, and a pressure measuring device, such as a mercury manometer or a Bourdon type pressure gauge 48, are connected in line with the water conduit 44. A safety device 50, e.g., a relief valve or a rupture disc, may be attached in line with the water conduit 44 to insure that the pressure in the engine cooling system does not build up during the test period to an excessive level resulting in damage to the cooling system.

A restrictor, such as an orifice 51, and an air reservoir 52 may be connected in line with the water conduit 44 to control the water flow rate into the system and provide for a slow, steady pressure rise in the system. The pressure measuring device 48 will indicate a slow, steady increase in pressure and therefore will be easier to read. The water flow control means 46 which is suitably a valve may be any type of valve which has a positive shut-off such as a needle, toggle, gate or globe valve.

The pressure tester described herein above may be used in combination with an apparatus for cleaning and filling automotive engine cooling systems as disclosed in U.S. Pats. No. 3,409,218, R. G. Moyer; No. 3,188,006, H. J. Falk; and, No. 3,180,759, H. J. Falk. Apparatus of the type disclosed in these patents are commonly referred to as "flush-fill" machines. These "flush-fill" machines have a fitting connected in-line with the heater-supply conduit and a water conduit connected to the fitting to allow passage of fluid from the apparatus into the engine cooling system. The water flow control means, pressure measuring device and safety device may be attached to the water conduit of the "flush-fill" machine.

The operation of the apparatus in accordance with the invention is as follows:

The whole automotive engine cooling system, i.e., with the radiator cap 38 seated on the radiator filler neck 36, will be pressure tested. The entire cooling system is full of water with the exception of the air space 54 at the top of the radiator 12 prior to pressure testing the system. If the pressure testing is begun after the system has been flushed there will be no air space 54, the entire system will be hydraulically full. The water conduit 44 is connected to the fitting 42 in the heater supply hose 24. The water flow control means 46 is set to allow water to enter the engine cooling system. The pressure build up in the system is indicated by the pressure measuring device 48. The system pressure will rise until the radiator cap opening pressure is reached. The safety device 50 will prevent overpressurization of the engine cooling system should the radiator cap 38 fail to open or if it opens and the radiator overflow tube 56, is blocked. When the opening pressure is reached any entrapped air will "bleed" out the radiator overflow tube 56. Once the air is removed water will begin to flow out of the overflow tube 56. At this point the water flow control means 46 is set, either manually or automatically, to prevent further flow of water into the engine cooling system. The pressure of the system will decrease slightly until the radiator cap 38 closes, at which point the pressure, as indicated on the pressure measuring device 48, should hold steady if there are no leaks in the system.

If a leak is indicated the system pressure will decrease and a visual inspection is then made of the entire engine cooling system to determine location of the leak. At the end of the testing cycle the pressure in the cooling system is lowered to atmospheric pressure by loosening the radiator cap 38, the drain cock 32, or the drain plug 34.

Preferably, the automotive engine cooling system should be pressure tested after the system has been properly flushed. A proper flushing will remove any dirt or sludge which may be blocking up leaks which would go undetected because of dirt pluggage. If the system is not flushed of dirt pluggage, a truly accurate picture of its pressure reliability will not be attained. The harm is that through use, the dirt pluggage may dislodge thereby exposing the leak and causing loss of the coolant. The proper way to flush an engine cooling system is well-known in the art.

The above-described method is applicable for pressure testing both the normally closed and normally open type of radiator cap. In the normally open pressure cap construction, the pressure will not rise as water is pumped into the system until all of the air has been expelled from the radiator and the water level reaches the pressure cap. The air vent in the cap will close and the continuing water feed to the system will build up enough pressure to lift the main valve in the cap off its seat in the radiator filler neck. In other respects, the pressure testing method is the same as that for the normally closed cap.

In order to facilitate leak detection an unreactive dye may be mixed into the water in order to make the leakage more visually apparent.

In the practice of the invention, the first time an automobile cooling system is tested by this technique, two pinch clamps are placed approximately 4 inches apart at an accessible portion of the heater-supply hose 24. The hose 24 is then cut and a fitting 42, is inserted in line with the hose 24 and locked in place with hose clamps. The water conduit 44 is then connected to the fitting 42. In the preferred embodiment of the invention the fitting 42 is a T-connection which has a standard male threaded fitting thereon of the garden hose type which can be sealed with a plastic female threaded cap.

From the foregoing it can be seen that the invention provides a novel and improved method and apparatus for pressure testing an automotive engine cooling system.

What is claimed is:

1. A pressure tester for pressure testing an automotive engine cooling system wherein said system includes an engine block, a heater, a heater-supply conduit connected between said engine block and heater, a radiator provided with a radiator cap, and means for connecting said engine block, heater, heater-supply conduit and radiator for circulating coolant therethrough; said pressure tester means comprising:
 a. a fitting having openings, connected in line with said heater-supply conduit of said engine cooling system;
 b. a water conduit connected between a source of pressurized water and an inlet opening of said fitting;
 c. means for controlling the flow of water through said water conduit and into said heater-supply conduit by way of said fitting; and
 d. means for measuring the pressure in said water conduit.

2. In combination: an automotive engine cooling system and means for pressure testing said engine cooling system, said engine cooling system including an engine block, a heater, a heater-supply conduit connected between said engine block and heater, a radiator provided with a radiator cap, and means for connecting said engine block, heater, heater-supply conduit and radiator for circulating coolant therethrough; said pressure testing means comprising:
 a. a fitting having openings, connected in line with said heater-supply conduit of said engine cooling system;
 b. a water conduit connected between a source of pressurized water and an inlet of said fitting;
 c. means for controlling the flow of water through said water conduit and into said heater-supply conduit by way of said fitting; and
 d. means for measuring the pressure in said water conduit.

3. The apparatus defined by claim 2 wherein said fitting is a T-connection.

4. The apparatus defined by claim 2 wherein said means for controlling the flow of water through said water conduit is a toggle valve.

5. The apparatus defined by claim 2 further including a safety device connected in said water conduit to prevent the pressure in the engine cooling system from reaching an excessive level.

6. The apparatus defined by claim 5 wherein said safety device is a pressure relief valve.

7. The apparatus defined by claim 2 wherein said means for measuring the pressure is a pressure gauge.

8. The apparatus defined by claim 2 further including means for releasing the water pressure in said engine cooling system.

9. In combination: an automotive engine cooling system and means for pressure testing said engine cooling system, said engine cooling system including an engine block, a heater, a heater-supply conduit connected between said engine block and heater, a radiator provided with a radiator cap, and means for connecting said engine block, heater- heater-supply conduit and radiator for circulating coolant therethrough; said pressure testing means comprising:
  a. a T-connection having its opposed outlets connected in line with said heater-supply conduit of said engine cooling system and having an inlet opening;
  b. a water conduit connected to said inlet opening of said T-connection;
  c. a valve in said water conduit for controlling the flow of water into said heater-supply conduit by way of said T-connection;
  d. pressure gauge connected to said water conduit; and
  e. a pressure relief valve connected to said water conduit.

10. A method for pressure testing an automotive engine cooling system including an engine block, a heater, a heater-supply conduit connected between said engine block and heater, and a radiator provided with a radiator cap, which method comprises:
  a. pumping water into said engine cooling system through an opening in said heater-supply conduit intermediate said engine block and heater and with said radiator cap in place on said radiator until said engine cooling system is hydraulically full;
  b. increasing the hydraulic pressure in said cooling system until the desired test pressure is reached to locate any leaks in said system by inspection; and then
  c. releasing the pressure in said engine cooling system.

11. A pressure tester for pressure testing an automotive engine cooling system wherein said system includes an engine block and heater, a heater-supply conduit connected between said engine block and heater, a radiator provided with a radiator cap, and means for connecting said engine block, heater, heater-supply conduit and radiator for circulating coolant therethrough; said pressure tester means comprising:
  a. a water conduit connected between a source of pressurized water and an inlet opening in said engine cooling system;
  b. means for controlling the flow of water through said water conduit and into said opening; and
  c. means for measuring the pressure in said water conduit.

* * * * *